Patented Aug. 8, 1939

2,168,535

UNITED STATES PATENT OFFICE 2,168,535

TEXTILE MATERIAL AND A PROCESS OF PREPARING IT

Josef Nuesslein and Georg von Finck, Frankfort-on-the-Main, and Hermann Stärk, Bad Soden in Taunus, Germany, assignors to I. G. Farbenindustrie Aktiengesellschaft, Frankfort-on-the-Main, Germany No Drawing. Application November 12, 1938, Serial No. 240,044. In Germany April 29, 1936

8 Claims. (Cl. 91—70)

This invention relates to improved textile material and to a process of preparing it.

This application is a continuation-in-part of application Serial No. 139,480, filed April 28, 1937, in the name of Joseph Nuesslein, Georg von Finck and Hermann Stärk.

The behavior of natural or regenerated cellulose towards acid dyestuffs may be increased and at the same time water-repellent (hydrophobic) properties may be imparted to the cellulose by treating it with condensation products of alpha-halogenmethylethers of the following general formula:

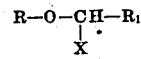

wherein X stands for halogen, R and $R_1$ stand for alkyl-, aryl-, aralkyl- or cyclo-alkyl radicals, and wherein $R_1$ may alternatively stand for hydrogen, with tertiary bases.

Now, we have found that the hydrophobic effect may be increased and may even be rendered practically fast to washing by impregnating textile materials, for instance natural or regenerated cellulose materials or materials of animal origin such as wool and silk or mixtures of such materials with solutions or dispersions containing besides a condensation product of the above-named kind mixed polymerizates from maleic acid or its derivatives and olefinic compounds in which at least one of the components contains an aliphatic residue of at least 10 carbon atoms.

There may be used, for instance, the following products: the mixed polymerizate from maleic anhydride and vinyl-octadecyl ether; the mixed polymerizate from maleic acid monomethyl ester and stearic acid-vinyl ester; the mixed polymerizate from maleic acid and vinyl-octodecyl ether; the mixed polymerizate from maleic acid mono-dodecyl ester and vinyl-dodecyl ether. Furthermore, there may be used maleic anhydride in combination with vinyl stearate or vinyl palmitate. Instead of the above-mentioned vinyl-octodecyl ether there may also be used the vinyl ether of the alcohol mixture formed by the reduction of coconut oil fatty acids and containing, for the main part, compounds with 12 to 14 carbon atoms, or the vinyl ether of the montan wax alcohol. Other vinyl ethers or esters may be used such as dodecylvinyl ethers, hexadecylvinylethers, tetradecylvinyl ethers, and vinyl esters of carboxylic acids containing at least 12 carbon atoms, such as lauric acid vinyl esters, myristic acid vinyl esters, the vinyl esters of fatty acids obtained by oxidation of paraffin. Another mixed polymerizate suitable for use may be obtained from maleic anhydride and isohexadecylene. Instead of the maleic anhydride there may also be used the free maleic acid and its mono- or diesters derived from aliphatic alcohols. These aliphatic alcohols may be of low or of high molecular weight. If the maleic acid ester contains a radical of high molecular weight, it is not always necessary that the vinyl compound used for preparing the mixed polymerizate should be of high molecular weight. Thus, there may be used as mixed polymerizates in some cases compounds such as vinyl acetate, vinyl chloride etc. together with maleic acid esters of high molecular weight. Furthermore, maleic acid dihexadecyl ester, for instance, may be used in combination with methacrylic acid methyl-ester, vinyl-ethyl ether or vinylmethyl ether. There may also be used other derivatives of maleic acid, such as the nitrile or the acid amide. The mixed polymerizates are, therefore, derived from maleic acid anhydride or compounds of the formula:

wherein $R_1$ and $R_2$ represent members of the group consisting of COOH, COO alkyl, CN, $CONH_2$, and other polymerizable olefinic compounds.

The hydrophobic effect is a particularly good one if mixtures are used containing between about 20 per cent. and about 60 per cent. of such a mixed polymerizate. The preparation of mixed polymerizates from maleic anhydride and vinyl compounds such as vinyl ethers or vinyl esters, is described in U. S. Patent No. 2,047,398.

The process is, for example, carried out in the following manner: A mixture of equal parts of stearoxymethylpyridinium chloride and of the mixed polymerizate from maleic anhydride and vinyloctadecylether, is dissolved in an organic solvent such as for instance carbon tetrachloride, methylene chloride, trichlorethylene, benzine, benzene, if desired at an elevated temperature. With a solution thus obtained the textile material is impregnated, if desired at an elevated temperature. The solvent is then evaporated, while heating or not, and the impregnated fabric is then subjected to a heat-treatment for some time, for instance for ½ to 1 hour, at a raised temperature. The heat-treatment may be performed at lower or higher temperature. A good hydrophobic effect which is fast to washing is obtained when heating to 70° C. or above. There may also be used temperatures of about 120° C. and above, provided that the heat has no detrimental action on the textile material.

The process may also be carried out by transforming a mixture of the above-named products into a stable aqueous emulsion with the aid of emulsifying agents and solvents such as, for instance, paraffin, impregnating the fabric with said emulsion, freeing the fabric from the excess of solution for instance by squeezing or centrifuging and then heating the fabric to an elevated temperature for some time, if desired after said fabric has been dried at a moderate temperature.

The condensation product from a tertiary base and an alpha-halogenmethylether and the mixed polymerization product may also be applied in separate baths, each by itself, in either order of succession. The method used is the same as above.

As alpha-halogenmethylethers of the above-named general formula there may be mentioned for instance: alpha-halogenmethylethers of alcohols containing at least 12 carbon atoms, such as for instance dodecylalcohol, tetradecylalcohol, cetylalcohol, octadecylalcohol, oleylalcohol, montan wax alcohol, furthermore the alcohols obtainable by catalytic reduction of resinic acids, moreover alcohols having the constitution of alkylphenoxyethylalcohol, alkylphenylalkylalcohol, alkylbenzylalcohol, the alkylcyclohexanoles, the carboxylic acid ethanol amides and so on.

The condensation products of the alpha-halogenalkylethers of said alcohols are obtained by means of aliphatic tertiary amines or aromatic tertiary amines or heterocyclic bases containing tertiary nitrogen. The said tertiary bases may contain the tertiarily bound nitrogen once or several times in the molecule. In the latter case the alpha-halogenmethylethers may have entered the molecule of the tertiary base several times. There may be formed, for instance, the reaction products of dodecylchloromethylether with tetramethylmethylenediamine, tetramethylethylenediamine and so on.

By the combination described in the present application a number of considerable improvements is attained in comparison with the methods hitherto known for imparting water-repellency to textile materials. Thus, the hydrophobic properties of the treated fabrics are greatly enhanced. This increase is more than the additive effect of the individual agents used and results especially in the fastness to washing of the effect attained. Besides, the fiber materials which have been treated with the condensation products from tertiary bases and the above-named halogenmethylethers show the drawback of disadvantageously influencing the shades of many substantive dyes and, above all, of damaging their fastness to light even considerably under certain circumstances. By the use of the condensation products from a tertiary base and alpha-halogenmethylether in combination with, for instance, a mixed polymerizate from maleic anhydride and a vinyl compound of high molecular weight it is possible to prevent to a high degree the said damage and deleterious affect of the fastness to light of substantive dyestuffs.

The following examples serve to illustrate the invention, but they are not intended to limit it thereto:

1. Artificial silk fabric is treated with a hot carbon tetrachloride solution containing per liter 10 grams of a mixed polymerizate from maleic anhydride and octadecyl vinyl ether and 10 grams of stearoxymethylpyridinium chloride. The material is then freed, by centrifuging, from the excess of solution and finally heated to 120° C. for half an hour. The material has thus become very hydrophobic.

2. Cotton fabric is impregnated with a carbon tetrachloride solution containing per liter 4 grams of a mixed polymerizate from maleic anhydride and hexadecylvinylether and 6 grams of the compound:

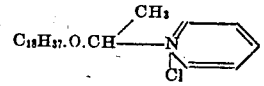

After having centrifuged the material, it is heated to a temperature of 130° C. for one hour.

3. Viscose artificial silk is treated with a carbon tetrachloride solution, heated to 60° C., which contains per liter 8 grams of stearoxymethylpyridinium chloride and 12 grams of a mixed polymerizate from maleic anhydride and stearic acid vinyl ester. After the solvent has been evaporated, the material is heated to 120° C. for half an hour.

4. Artificial silk crape is impregnated with a carbon tetrachloride solution, containing per liter 10 grams of stearoxymethyl-trimethylammonium chloride and 5 grams of a mixed polymerizate from maleic anhydride and octadecylvinylether. After having centrifuged the material, it is heated to a temperature of 135° C. for half an hour.

5. Viscose artificial silk is treated with an aqueous emulsion, heated to 50° C., which contains per liter 10 grams of stearoxymethylpyridinium chloride, 2.3 grams of the mixed polymerizate from maleic anhydride and octadecylvinylether, 7 grams of paraffin and 1.2 grams of polyvinylalcohol. The fabric is then squeezed and heated to 120° C. to 130° C. for 20 minutes.

6. Cotton calico is treated for half an hour with an aqueous solution of 1 per cent. strength of the quaternary ammonium salt obtained from octadecyl-chloro-methyl ether and dimethyl-amino-ethylmethyl ether:

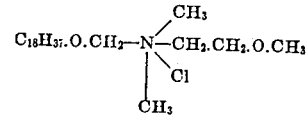

The material is then squeezed, dried for 2 hours at 90° C. and impregnated with a solution of carbon tetrachloride containing 5 grams of a mixed polymerizate obtained from maleic anhydride and vinyl-octadecyl ether. The material is centrifuged and dried at 80° C. The fabric thus obtained is to a great extent impermeable to water.

7. Woolen, silk or artificial silk clothing material is treated for 5 minutes in a solution containing per liter of carbon tetrachloride 5 grams of the mixed polymerizate from maleic acid monodecylester and vinyldodecylether and dried in the air. After evaporation of the solvent, the material is introduced into a second bath containing per liter of water 10 grams of stearylhydroxymethyl-pyridinium chloride. The material is subsequently squeezed and dried for about 1 hour at 80° C. to 100° C.; it is then washed in another aqueous solution containing per liter 5 grams of soap and 2 grams of sodium carbonate, rinsed and dried.

8. Cotton or artificial silk clothing material is treated in a solution which contains per liter of water 10 grams of the pyridinium salt of the mixed polymerizate from maleic acid and vinylstearic acid ester, dried and heated for 15 minutes at 110° C.; the material is then treated for a short time in a second bath containing per liter of water 10 grams of stearyl-hydroxy-methyl-pyridinium chloride, and dried at 80° C. to 90° C.

9. Natural silk fabric or woolen fabric is impregnated for a short time in a solution containing per liter of carbon tetrachloride 5 grams of a mixed polymerizate of vinyloctadecylether and maleic acid anhydride, squeezed and then, after the solvent has been evaporated, once more impregnated in a second bath containing per liter of water 5 grams of the pyridinium compound of stearyl-chloromethylether and 5 grams of stearic acid methylolamide (the latter in suspension), then squeezed and dried at 100° C. to 120° C.

We claim:

1. A process of imparting water-repellency to textile material by impregnating the textile material with a condensation product of a tertiary amine with an alpha-halogen ether of the formula:

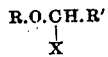

wherein X stands for halogen, R.O stands for the radical of an alcohol containing at least 12 carbon atoms, R' stands for a member of the group consisting of hydrogen and aliphatic, aromatic, araliphatic and cycloaliphatic hydrocarbon radicals, and with a mixed polymerizate containing at least one aliphatic radical with at least 10 carbon atoms being composed of a compound selected from the group consisting of maleic anhydride and compounds of the formula:

$R_1$ and $R_2$ standing for members of the group consisting of COOH, COO.alkyl, CN, $CONH_2$, and oleifinic compounds capable of being polymerized, and heating the impregnated textile material at an elevated temperature whereby water-proofing thereof results, the water-proofing being due to the conjoint action of said mixed polymerizate and said condensation product of a tertiary amine with an alpha-halogen ether.

2. A process of imparting water-repellency to textile material by impregnating the textile material with stearoxymethylpyridinium chloride and with a mixed polymerizate from maleic anhydride and octadecylvinylether, drying the treated textile material and heating it subsequently at an elevated temperature.

3. A process of imparting water-repellency to textile material by impregnating the textile material with stearoxymethylpyridinium chloride and with a mixed polymerizate from maleic anhydride and stearic acid vinyl ester, drying the impregnated textile material and heating it subsequently at an elevated temperature.

4. A process of imparting water-repellency to textile material by impregnating the textile material with stearoxymethyltrimethylammonium chloride and with a mixed polymerizate from maleic anhydride and octadecylvinylether, drying the treated textile material and heating it subsequently at an elevated temperature.

5. Water-proofed textile material impregnated with a condensation product of a tertiary amine with an alpha-halogen ether of the formula:

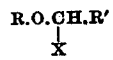

wherein X stands for halogen, R.O stands for the radical of an alcohol containing at least 12 carbon atoms, R' stands for a member of the group consisting of hydrogen and aliphatic, aromatic, araliphatic and cycloaliphatic hydrocarbon radicals, and with a mixed polymerizate containing at least one aliphatic radical with at least 10 carbon atoms being composed of a compound selected from the group consisting of maleic anhydride and compounds of the formula:

$R_1$ and $R_2$ standing for members of the group consisting of COOH, COO.alkyl, CN, $CONH_2$, and of olefinic compounds capable of being polymerized, and heated at an elevated temperature after the impregnation, the water-proof character of said textile material being caused by the conjoint action of said mixed polymerizate and said condensation product of a tertiary amine with an alpha-halogen ether.

6. Water-proofed textile material impregnated with stearoxymethylpyridinium chloride and with a mixed polymerizate from maleic anhydride and octadecylvinylether and heated at an elevated temperature after the impregnation.

7. Water-proofed textile material impregnated with stearoxymethylpyridinium chloride and with a mixed polymerizate from maleic anhydride and stearic acid vinyl ester and heated at an elevated temperature after the impregnation.

8. Water-proofed textile material impregnated with stearoxymethyltrimethylammonium chloride and with a mixed polymerizate from maleic anhydride and octadecylvinylether and heated at an elevated temperature after the impregnation.

JOSEF NUESSLEIN.
GEORG VON FINCK.
HERMANN STÄRK.